US012627076B2

(12) United States Patent
Göttl

(10) Patent No.: US 12,627,076 B2
(45) Date of Patent: May 12, 2026

(54) MOBILE COMMUNICATION ANTENNA

(71) Applicant: Telefonaktiebolaget LM Ericsson (publ), Stockholm (SE)

(72) Inventor: Maximilian Göttl, Frasdorf (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 262 days.

(21) Appl. No.: 18/027,940

(22) PCT Filed: Sep. 24, 2020

(86) PCT No.: PCT/EP2020/076686

§ 371 (c)(1),
(2) Date: Mar. 23, 2023

(87) PCT Pub. No.: WO2022/063400

PCT Pub. Date: Mar. 31, 2022

(65) Prior Publication Data

US 2023/0369782 A1 Nov. 16, 2023

(51) Int. Cl.
*H01Q 21/26* (2006.01)
*H01Q 1/24* (2006.01)
(Continued)

(52) U.S. Cl.
CPC ............. *H01Q 21/26* (2013.01); *H01Q 1/246* (2013.01); *H01Q 1/525* (2013.01); *H01Q 5/42* (2015.01); *H01Q 23/00* (2013.01)

(58) Field of Classification Search
CPC .......... H01Q 1/246; H01Q 1/525; H01Q 5/42; H01Q 21/26; H01Q 23/00
See application file for complete search history.

(56) References Cited

U.S. PATENT DOCUMENTS 6,160,514 A * 12/2000 Judd .................... H01Q 21/065
343/700 MS
6,889,061 B2 * 5/2005 Shapira ................ H04B 7/0615
455/562.1

(Continued)

FOREIGN PATENT DOCUMENTS

WO 0186823 A2 11/2001
WO WO-2020034905 A1 * 2/2020 ............. H01Q 1/002

OTHER PUBLICATIONS

International Search Report and Written Opinion for International Patent Application No. PCT/EP2020/076686, mailed Jun. 18, 2021, 15 pages.

*Primary Examiner* — Amal Patel
(74) *Attorney, Agent, or Firm* — Withrow & Terranova, PLLC

(57) ABSTRACT

A mobile communication antenna comprises a reflector arrangement and a plurality of dual-polarized radiators, which are arranged in at least m columns on the reflector arrangement, with m≥2. The plurality of dual-polarized radiators comprises multiple dual-polarized TX radiators and multiple dual-polarized RX radiators. Each of the multiple dual-polarized TX radiators comprises a signal connector arrangement, wherein the respective signal connector arrangement is connected only to a transmitter arrangement for communicating a mobile communication signal. Each of the multiple dual-polarized RX radiators comprises a signal connector arrangement, wherein the respective signal connector arrangement is connected only to a receiver arrangement for communicating a mobile communication signal. The multiple dual-polarized TX radiators are arranged in at least two columns and the multiple dual-polarized RX radiators are arranged in at least two columns.

12 Claims, 9 Drawing Sheets

(51) Int. Cl.

| | |
|---|---|
| ***H01Q 1/52*** | (2006.01) |
| ***H01Q 5/42*** | (2015.01) |
| ***H01Q 23/00*** | (2006.01) |

(56) References Cited

U.S. PATENT DOCUMENTS

| | | | | |
|---|---|---|---|---|
| 7,808,443 | B2 | 10/2010 | Lindmark et al. | |
| 2010/0127949 | A1 | 5/2010 | Shimizu et al. | |
| 2015/0263435 | A1* | 9/2015 | Song | H01Q 21/26<br>343/810 |
| 2017/0264014 | A1 | 9/2017 | Le-Ngoc | |
| 2021/0167804 | A1* | 6/2021 | Xiao | H04B 1/7093 |

* cited by examiner

MOBILE COMMUNICATION ANTENNA

This application is a 35 U.S.C. § 371 national phase filing of International Application No. PCT/EP2020/076686, filed Sep. 24, 2020, the disclosure of which is incorporated herein by reference in its entirety.

TECHNICAL FIELD

The invention relates to a mobile communication antenna which is used to transmit and receive mobile communication signals, for example from cell phones.

BACKGROUND

Mobile communication antennas are used to establish a communication to cell phones. Those mobile communication antennas are normally mounted on roofs or shafts for example. Depending on the number of mobile communication bands and the coverage, the dimensions of the needed mobile communication antennas could be quite large. This may result in critical wind load conditions and in higher rents for the operator.

U.S. Pat. No. 7,808,443 B2 describes a mobile communication antenna. The mobile communication antenna has the plurality of radiators arranged in one column. The signals, which comprise transmission signals and receiving signals (TX/RX) of half of the radiators are filtered using a low-pass filter and the signals of the other half of the radiators, which also comprise transmission signals and receiving signals (TX/RX) are filtered using a high pass. Those filters and therefore the antenna have quite large dimensions.

As such, it would be desirable to have a mobile communication antenna with reduced weight and with reduced dimensions without decreasing electrical properties.

SUMMARY

An object of the present invention is seen in building a compact mobile communication antenna, wherein the electrical parameters are reproducible.

The object is solved by a mobile communication antenna according to claim 1. Claims 2 to 12 describe further embodiments of the mobile communication antenna.

The mobile communication antenna comprises a reflector arrangement. The reflector arrangement could be made of a single metal piece (for example a metal sheet) or of a plurality of metal pieces. Furthermore, the reflector arrangement could also be made of at least one printed circuit board comprising a metal layer or of coated dielectric(s). In addition, a plurality of dual-polarized radiators is provided. They are arranged in at least m columns on the first side of the reflector arrangement, with m≥2, 3, 4, 5, 6, 7, 8, 9, 10, 11, 12, 13, 14, 15, 16; 32, 64, 128. The plurality of dual-polarized radiators comprises multiple dual-polarized TX radiators (TX=Transmitter) and multiple dual-polarized RX radiators (RX=Receiver). Preferably, there are as many dual-polarized TX radiators as there are dual-polarized RX radiators. Each of the multiple dual-polarized TX radiators comprises a signal connector arrangement. The respective signal connector arrangement is only connected to the transmitter arrangement for communicating of the mobile communication signal. The wording "signal connector arrangement" has to be understood in such a way that the mobile communication signal is fed to this connector. The signal line of this connector is therefore preferably not connected to ground. The signal connector arrangement of the multiple dual-polarized TX radiators is therefore connected at some stage to a at least one power amplifier, wherein this at least one power amplifier is only used to amplify mobile communication signals that are intended to be transmitted from the mobile communication antenna and which are intended to be sent to the cell phones for example. Furthermore, each of the multiple dual-polarized RX radiators also comprises a signal connector arrangement. The signal connector arrangement is thereby only used to communicate the received mobile communication signals. The signal line of this connector is preferably not connected to ground. The signal connector arrangement of the multiple dual-polarized RX radiators is therefore connected at some stage to at least one low noise amplifier, wherein this at least one low noise amplifier is only used to amplify mobile communication signals that are received from the cell phones for example via the multiple dual-polarized RX radiators. In other words, a signal processing device (for example the radio) only receives receiving signals (for example from the cell phones) from the multiple dual-polarized RX radiators. The signal processing device (for example the radio) only transmits transmitting signals (for example to the cell phones) to the multiple dual-polarized TX radiators. The multiple dual-polarized TX radiators are only used to transmit a mobile communication signal (transmitting signal) for example to mobile devices, wherein the multiple dual-polarized RX radiators are only used to receive a mobile communication signal for example from mobile devices.

As a result, the isolation between the multiple dual-polarized TX radiators and the multiple dual-polarized RX radiators is increased up to 10 dB to 15 dB. As such the passive intermodulation (PIM) between transmitting signals and receiving signals is attenuated. As such, the mobile communication antenna can provide all the necessary mobile communication bands of the operator (carrier aggregation). The separation of the transmission signal path and the receiving signal path by using different radiators allows that separate filters can be used within the transmission signal path and the receiving signal path. This in turn allows that the filter specifications can be reduced, because the filters in the receiving signal path receive mobile communication signals with a smaller signal power than the filters in the transmission signal path. Therefore, the mobile communication antenna can be built more compact. Not only the manufacturing costs are reduced but also the width of the antenna can be reduced which comes with a reduced wind load and with reduced costs for renting cell sites.

In a preferred embodiment of the present invention, the multiple dual-polarized TX radiators are configured to transmit mobile communication signals in two polarizations of a first polarization type. Contrary to that, the multiple dual-polarized RX radiators are configured to receive mobile communication signals in two polarizations of a second polarization type. In that case, the isolation between the multiple dual-polarized TX radiators and the multiple dual-polarized RX radiators further increases for example by 3 dB.

The first and the second polarization types are different to each other. For example, a first polarization type is the ±45° polarization and a second polarization type is a horizontal/vertical polarization. It could also be vice versa, wherein the first polarization type could be a horizontal/vertical polarization and wherein the second polarization type could be a ±45° polarization. Other polarization types could also be used, like for example elliptic and circular.

In another preferred embodiment of the present invention, the multiple dual-polarized TX radiators are of the same type as the multiple dual-polarized RX radiators. It could also be that the multiple dual-polarized TX radiators are of a different radiator type than the dual-polarized RX radiators. For example, the multiple dual-polarized TX radiators could be cross dipoles, vector dipoles or patch radiators and/or the multiple dual-polarized RX radiators could be also cross dipoles, vector dipoles or patch radiators.

Because of the increased isolation between the TX radiators and the RX radiators, the dual-polarized TX radiators can be placed closer together (compared to common antennas) and/or the dual-polarized RX radiators can be placed closer together. A distance between two dual-polarized TX radiators in the same column could be larger than 0.25Λ, 0.3Λ, 0.35Λ, 0.4Λ, 0.45Λ, 0.5Λ, 0.55Λ, 0.60Λ or larger than 0.65Λ and/or smaller than 0.7Λ, 0.65Λ, 0.60Λ, 0.55Λ, 0.50Λ, 0.45Λ, 0.40Λ or smaller than 0.35Λ. Λ is preferably the wave length of the mid-frequency of the dual-polarized TX radiator. In addition or alternatively a distance between two dual-polarized RX radiators in the same column is larger than 0.25Λ, 0.3Λ, 0.35Λ, 0.4Λ, 0.45Λ, 0.5Λ, 0.55Λ, 0.60Λ or larger than 0.65Λ and/or smaller than 0.7Λ, 0.65Λ, 0.60Λ, 0.55Λ, 0.50Λ, 0.45Λ, 0.40Λ or smaller than 0.35Λ. Λ is preferably the wave length of the mid-frequency of the dual-polarized RX radiator. This allows that the mobile communication antenna of the present invention is smaller in size despite separate radiators being used for the transmitting and receiving signals compared to communication antennas of the state-of-the-art.

In another preferred embodiment of the present invention, a signal processing device is provided. The multiple dual-polarized TX radiators are connected to the signal processing device via the transmitter arrangement. In addition, the multiple dual-polarized RX radiators are connected to the signal processing device via the receiver arrangement. The signal processing device could preferably also be called as radio.

In another preferred embodiment of the present invention, the transmitter arrangement comprises a filter device with one or more transmitting filters. Furthermore, the receiver arrangement comprises a filter device with one or more receiving filters. The receiving filter or the receiving filters in the receiver arrangement are of a different filter type than the transmitting filter or the transmitting filters in the transmitter arrangement. This allows that less expensive filters can be used in the receiver arrangement compared to the filters in the transmitter arrangement. The signal power in the receiver arrangement is much smaller than the signal power in the transmitter arrangement, so that the filters which can be used in the receiver arrangement are a lot smaller than the filters that have to be used in the transmitter arrangement. This in turn results in a more lightweight mobile communication antenna and in a smaller mobile communication antenna. When thinking of a mMIMO system comprising 16, 32 or 64 transmission paths for each polarization as well as 16, 32 or 64 receiving paths for each polarization, there is a huge difference if the receiving filters are ceramic filters, BAW-filters (bulk acoustic wave) or SAW-filters (surface acoustic wave) which preferably have dimensions of approximately 2 mm×2 mm or 4 mm×4 mm and which can more preferably be bonded and/or directly soldered to a printed circuit board, wherein the transmitting filters are more preferably cavity filters made of diecast aluminium for example.

In another preferred embodiment of the present invention, the transmitter arrangement comprises a transmission signal path for each polarization of each dual-polarized TX radiator and for each group of interconnected dual-polarized TX radiators, wherein at least one transmitting filter with several filter circuits is arranged in each transmission signal path. The same is also true for the receiver arrangement. The receiver arrangement comprises a receiving signal path for each polarization of each dual-polarized RX radiator and for each group of interconnected dual-polarized RX radiators, wherein the at least one receiving filter with several filter circuits is arranged in each receiving signal path.

Each transmitting filter has preferably less than 11, 10, 9, 8, 7, 6 or less than 5 filter circuits but preferably more than 4, 5, 6, 7, 8 or more than 9 filter circuits. The same is preferably also true for each receiving filter. By using specific radiators only for the transmission signals and specific radiators only for the receiving signals which could also use different polarizations types, the filter circuits can be reduced by at least one or two circuits (because of the higher isolation between the TX radiators and the RX radiators).

In another preferred embodiment of the present invention, the transmitter arrangement comprises a transmission signal path for each polarization of each dual-polarized TX radiator and for each group of interconnected dual-polarized TX radiators. At least one power amplifier is arranged in each transmission signal path. Furthermore, the power amplifier connected to a group of interconnected dual-polarized TX radiators has preferably a higher output power than the power amplifier connected to a single dual-polarized TX radiator.

In another preferred embodiment of the present invention, the signal processing device is configured to generate individual transmission signals for each (polarization of each) dual-polarized TX radiator and/or group-based transmission signals for (each polarization of) a group of interconnected dual-polarized TX radiators. An individual transmission signal and a group-based transmission signal preferably include a transmission signal for a first and a second polarization. Furthermore, the transmitter arrangement is preferably configured to transmit the individual transmission signals to the corresponding dual-polarized TX radiator. The transmission arrangement is also configured to transmit the group-based transmission signals to the corresponding group of interconnected dual-polarized TX radiators. In addition or alternatively, the receiver arrangement is configured to receive individual receiving signals (of each polarization) from the dual-polarized RX radiators and is further configured to transmit the individual receiving signals (of each polarization) to the signal processing device. An individual receiving signal and a group-based receiving signal preferably includes a receiving signal for a first and a second polarization. Furthermore, the receiver arrangement could also be configured to receive group-based receiving signals (of each polarization) from a group of interconnected dual-polarized RX radiators and is further configured to transmit those group-based receiving signals (of each polarization) to the signal processing device.

In another preferred embodiment of the present invention, the signal processing device is preferably configured to transform the individual receiving signals (of each polarization) and/or the group-based receiving signal (of each polarization) so that the polarization corresponds to the polarization of the individual transmission signals and/or to the polarization of the group-based transmission signals. This means that if the individual receiving signal has a vertical/horizontal polarization that this polarization is transformed to ±45° polarization and vice versa.

In another preferred embodiment of the present invention, each of the m columns comprises multiple dual-polarized TX radiators as well as multiple dual-polarized RX radiators, wherein both radiator types are arranged alternatingly in each column. This means that after one dual-polarized TX radiator a dual-polarized RX radiator follows and then again another TX radiator and so on.

In another preferred embodiment of the present invention, within each of the m columns, the multiple dual-polarized TX radiators as well as the multiple dual-polarized RX radiators are arranged at the same position. Therefore, the m columns are identically constructed. On the other hand, it would also be possible, that the dual-polarized TX radiators are arranged in the at least one odd-numbered column or in multiple odd-numbered columns (for example in all odd-numbered columns) at positions where the dual polarized RX radiators are arranged in the at least one even-numbered column or in the multiple even-numbered columns (or in all multiple even-numbered columns). Furthermore, the dual-polarized RX radiators are arranged in the at least one odd-numbered column or in multiple odd-numbered columns (or in all odd-numbered columns) at positions, where the dual-polarized TX radiators are arranged in the at least one even-numbered column or in multiple even-numbered columns (or in all multiple even-numbered columns).

In another preferred embodiment of the present invention, m is at least 4. The multiple dual-polarized TX radiators are arranged predominantly or preferably exclusively in odd-numbered columns and the multiple dual-polarized RX radiators are arranged predominantly or exclusively in even-numbered columns. Alternatively, the multiple dual-polarized TX radiators are arranged predominantly or exclusively in even-numbered columns and the multiple dual-polarized RX radiators are arranged predominantly or exclusively in odd-numbered columns. The wording "predominantly" could be understood in such a way, that all the radiators in the respective column are either dual-polarized TX radiators or dual-polarized RX radiators except for the radiator in the first and/or last row. This radiator could then be of the other type, namely a dual-polarized RX radiator or a dual-polarized TX radiator.

In another preferred embodiment of the present invention, m is only an even number.

The plurality of radiators is configured to operate in various frequency bands. They could operate in the low band, the mid-band and the high band. Preferably the plurality of radiators are broadband so that they cover more than one mobile communication band. For example they could cover the mobile communication bands B1/B3 or B66/25.

The multiple dual-polarized TX radiators could be of a different size than the multiple dual-polarized RX radiators. The size depends on the frequency range the respective TX/RX radiators are used for.

The low band preferably comprises a frequency range of 600 MHz or 650 MHz or 698 MHz to 960 MHz.

The mid-band preferably comprises a frequency range of 1427 MHZ to 2700 MHz or 1695 MHZ to 2700 MHz.

The high band preferably comprises a frequency range of 3300 MHz to 3800 MHz or 3300 MHZ to 4200 MHz or 4500 MHz to 5000 MHz, 6000 MHz or 7000 MHz or 8000 MHz.

BRIEF DESCRIPTION OF THE DRAWINGS

Different embodiments of the invention will be described in the following, by way of example and with reference to the drawings. The same elements are provided with the same reference signs. The figures show in detail.

a view on the plurality of radiators in m columns comprising multiple dual-polarized TX radiators and multiple dual-polarized RX radiators according to one embodiment of the present invention;

FIGS. 3A, 3B:

a view on the plurality of radiators in m columns comprising multiple dual-polarized TX radiators and multiple dual-polarized RX radiators according to another embodiment of the present invention;

FIGS. 4A, 4B:

a view on the plurality of radiators in m columns comprising multiple dual-polarized TX radiators and multiple dual-polarized RX radiators according to another embodiment of the present invention; and

FIGS. 5A, 5B:

a view on the plurality of radiators in m columns comprising multiple dual-polarized TX radiators and multiple dual-polarized RX radiators according to another embodiment of the present invention; and

DETAILED DESCRIPTION

Figure 1:
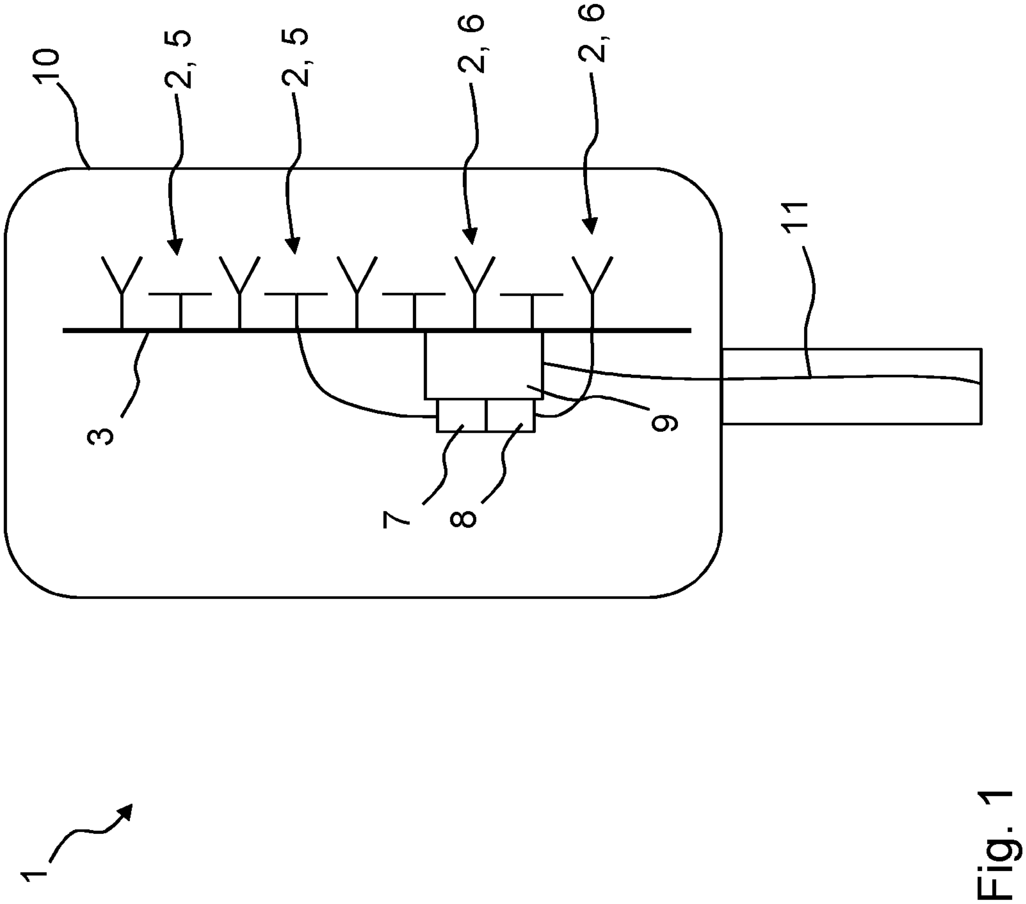
FIG. 1: a mobile communication antenna according to the present invention.

FIG. 1 shows a mobile communication antenna 1 with a plurality of dual-polarized radiators 2. More preferably, the mobile communication antenna 1 is dual-polarized massive MIMO mobile communication antenna 1. There is also a reflector arrangement 3. The plurality of dual-polarized radiators 2 are arranged on a first side of the reflector arrangement 3. The plurality of dual-polarized radiators 2 are arranged in at least m columns 4, with m≥2, 3, 4, 5, 6, 7, 8, 9, 10, 11, 12, 13, 14, 15, 16; 32, 64, 128. The plurality of dual-polarized radiators 2 comprises multiple dual-polarized TX radiators 5 and multiple dual-polarized RX radiators 6.

Each of the multiple dual-polarized TX radiators 5 comprises a signal connector arrangement, wherein (the signal line of) the respective signal connector arrangement is only connected to a transmitter arrangement 7. The signal connector arrangement preferably comprises two connection ports, wherein a first connection port is used for communicating a transmission signal of a first polarization to the respective dual-polarized TX radiator 5 and wherein a second connection port is used for communicating a transmission signal of a second polarization to the respective dual-polarized TX radiator 5.

The multiple dual-polarized TX radiators 5 are therefore only used for transmitting a transmission signal (for example to a mobile device).

Each of the multiple dual-polarized RX radiators 6 comprises signal connector arrangement, wherein (the signal line of) the respective signal connector arrangement is only connected to a receiver arrangement 8. The signal connector arrangement preferably comprises two connection ports, wherein a first connection port is used for communicating a receiving signal of a first polarization from the respective dual-polarized RX radiator 6 to the receiver arrangement 8 and wherein a second connection port is used for communicating a receiving signal of a second polarization from the respective dual-polarized RX radiator 6 to the receiver arrangement 8.

The multiple dual-polarized RX radiators 6 are therefore only used for receiving a receiving signal (for example from a mobile device).

The multiple dual-polarized TX radiators 5 are therefore free of a connection to the receiver arrangement 8. The multiple dual-polarized RX radiators 6 are therefore free of a connection to the transmitter arrangement 7.

Preferably, the multiple dual-polarized TX radiators 5 and the multiple dual-polarized RX radiators 6 are configured to operate in massive MIMO.

The multiple dual-polarized TX radiators 5 and the multiple dual-polarized RX radiators 6 are preferably arranged on the first side of the reflector arrangement 3. The transmitter arrangement 7 and the receiver arrangement 8 are preferably arranged on a second side of the reflector arrangement 3. The second side is opposite to the first side.

More preferably, there could also be phase shifter arrangement arranged on the second side of the reflector arrangement. However, even more preferably, a signal processing device 9 is provided. The signal processing device 9 is electrically connected to the transmitter arrangement 7 and to the receiver arrangement 8. In other words, the signal processing device 9 is electrically connected to the multiple dual-polarized TX radiators 5 via the transmitter arrangement 7 and to the multiple dual-polarized RX radiators 6 via receiver arrangement 8. The signal processing device 9 could also be called radio. The signal processing device 9 is preferably connected to a base station (not shown) via feeder cables 11.

The signal processing device 9 is configured to generate individual transmission signals, wherein each of those individual transmission signals is only transmitted to one dual-polarized TX radiator 5. In addition or alternatively the signal processing device 9 is configured to generate group-based transmission signals, wherein each of those group-based transmission signals is transmitted to a group of interconnected dual-polarized TX radiators 5. The wording “interconnected” has to be understood in such a way that the first connection ports of at least two dual-polarized TX radiators 5 are electrically connected to each other and to the transmitter arrangement 7. In addition, the second connection ports of the at least two dual-polarized TX radiators 5 are also electrically connected to each other and to the transmitter arrangement 7. The distance (for example cable length) of each of the first connection ports and/or second connection ports of the respective interconnected dual-polarized TX radiators 5 to the transmitter arrangement 7 could be of the same length or of a different length. The transmitter arrangement 7 is also configured to transmit the individual transmission signals to the corresponding dual-polarized TX radiators 5. In addition or alternatively, the transmitter arrangement 7 is configured to transmit the group-based transmission signals to the corresponding group of interconnected dual-polarized TX radiators 5. The individual transmission signals comprise signals for both polarizations. The group-based transmission signals also comprise signals for both polarizations.

The receiver arrangement 8 is configured to receive individual receiving signals from the dual-polarized RX radiators 6 and the receiver arrangement 8 is further configured to communicate (transmit) those individual receiving signals to the signal processing device 9. The individual receiving signals comprise receiving signals of a first polarization and a second polarization. In addition or alternatively, the receiver arrangement 8 is configured to receive group-based receiving signals from a group of interconnected dual-polarized RX radiators 6. The receiver arrangement 8 is then configured to communicate those group-based receiving signals to the signal processing device 9. The wording “interconnected” has to be understood in such a way that the first connection ports of at least two dual-polarized RX radiators 6 are electrically connected to each other and to the receiver arrangement 8. In addition, the second connection ports of the at least two dual-polarized RX radiators 6 are also electrically connected to each other and to the receiver arrangement 8. The distance (for example cable length) of each of the first connection ports and/or second connection ports of the respective interconnected dual-polarized RX radiators 6 to the receiver arrangement 8 could be of the same length or of a different length. The individual receiving signals comprise signals for both polarizations. The group-based receiving signals also comprise signals for both polarizations.

It is very beneficial that separate radiators 2 are used for transmitting a mobile communication signal and for receiving a mobile communication signal. This increases the isolation between the multiple dual-polarized TX radiators 5 and the multiple dual-polarized RX radiators 6.

The transmitter arrangement 7 preferably comprises a filter device with one or more transmitting filters. The same is also true for the receiver arrangement 8 which comprises a filter device with one or more receiving filters. Preferably, the receiving filter receiving filters in the receiving arrangement 8 are of a different filter type than the transmitting filter or transmitting filters in the transmitter arrangement 7. The transmitting filter is preferably a cavity filter, wherein the receiving filter is a ceramic filter, a BAW-filters (bulk acoustic wave) or a SAW-filters (surface acoustic wave) which preferably have dimensions of approximately 2 mm×2 mm or 4 mm×4 mm and which can more preferably be bonded and/or directly soldered to a printed circuit board.

Furthermore, the transmitter arrangement 7 comprises a transmission signal path for each polarization of each dual-polarized TX radiator 5 and/or for each group of interconnected dual-polarized TX radiators 5. At least one transmitting filter comprising several filter circuits is arranged in each transmission signal path. The receiver arrangement 8 comprises a receiving signal path for each polarization of each dual-polarized RX radiators 6 and/or group of interconnected dual-polarized RX radiators 6. The at least one receiving filter with several filter circuits is arranged in each receiving signal path. The at least one receiving filter in the respective receiving signal path is smaller in relation to the spatial dimensions than the at least one transmitting filter in the respective transmission signal path.

The at least one transmitting filter in the respective transmission signal path is preferably configured in such a way that the individual transmission signals for the respective dual-polarized TX radiator 5 and/or group-based transmission signals for a group of interconnected TX radiators 5 are allowed to pass, wherein other frequency bands are attenuated.

The at least one receiving filter in the respective receiving signal path is preferably configured in such a way that the individual receiving signals from the respective dual-polarized RX radiator 6 and/or group-based receiving signals for a group of interconnected RX radiators 6 are allowed to pass, wherein other frequency bands are attenuated.

The transmitter arrangement 7 preferably comprises in each transmission signal path at least one power amplifier. The power amplifier which is connected to a group of interconnected dual-polarized TX radiators 5 has preferably a higher maximum output power than the power amplifier which is connected to only one dual-polarized TX radiator 5.

A radome 10 closes the mobile communication antenna 1.

Figure 2A:
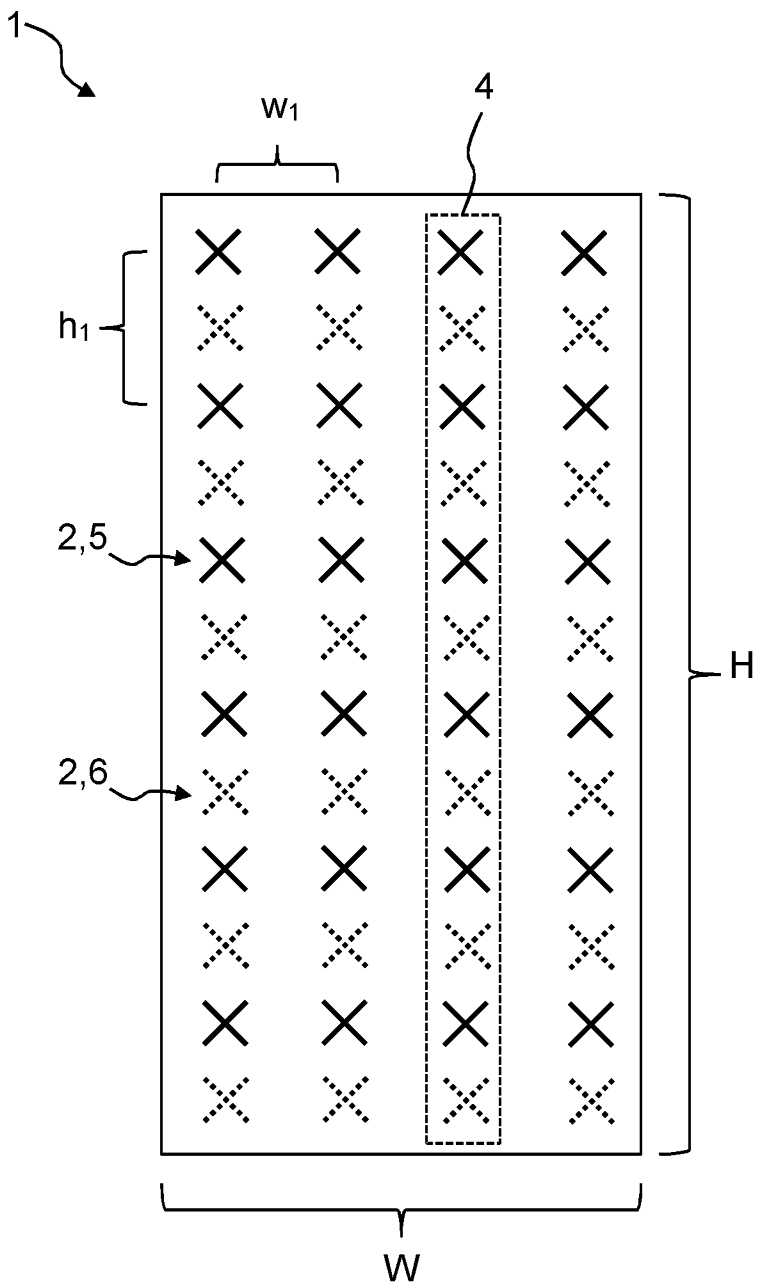
FIGS. 2A, 2B.

FIG. 2A shows a view on the plurality of radiators in m columns 4 comprising multiple dual-polarized TX radiators 5 and multiple dual-polarized RX radiators 6 according to one embodiment of the present invention. In FIG. 2A, there are four columns 4 (m=4). Within each column 4, there are several radiators 2. In that case, there are 12 radiators 2 in each column 4. Preferably each column 4 comprises the same amount of radiators 2. The plurality of radiators 2 which are distributed through all m columns 4 comprise multiple dual-polarized TX radiators 5 and multiple dual-polarized RX radiators 6. The multiple dual-polarized TX radiators 5 and the multiple dual-polarized RX radiators 6 are arranged in at least two columns 4. In the embodiment of FIG. 2A, the multiple dual-polarized TX radiators 5 and RX radiators 6 are arranged in four columns 4. Each of the m columns comprises both multiple dual-polarized TX radiators 5 and multiple dual-polarized RX radiators 6. Preferably, each column 4 comprises the same amount of dual-polarized TX radiators and dual-polarized RX radiators 6. More preferably, the dual-polarized TX radiators 5 and the multiple dual-polarized RX radiators 6 are arranged alternatingly in each column 4. In the embodiment of FIG. 2A, there are six dual-polarized TX radiators 5 and six dual-polarized RX radiators 6. However, the amount of radiators 2 in each column 4 is arbitrary. Preferably, there are 4, 5, 6, 7, 8, 9, 10, 11, 12, 13, 14, 15, 16, 17, 18, 19, 20 or more than 20 radiators 2 in each of the columns 4.

The width W of the housing of the mobile communication antenna 1 is preferably 320 mm. Deviations of less than ±20%, 15%, 10% or less than 5% are possible.

The height H of the housing of the mobile communication antenna 1 is preferably 650 mm. Deviations of less than ±20%, 15%, 10% or less than 5% are possible.

The radiators 2 with the solid line are multiple dual-polarized TX radiators 5. The radiators 2 with the dotted line are multiple dual-polarized RX radiators 6. A distance $h_1$ between two dual-polarized TX radiators 5 in the same column 4 is preferably 100 mm. The distance is preferably measured between the centers of each dual-polarized TX radiator 5. Deviations of less than ±20%, 15%, 10% or less than 5% are possible. The distance $h_1$ is more preferably larger than 0.25Λ, 0.3Λ, 0.35Λ, 0.4Λ, 0.45Λ, 0.5Λ, 0.55Λ, 0.60Λ or larger than 0.65Λ. The distance $h_1$ is more preferably smaller than 0.7Λ, 0.65Λ, 0.60Λ, 0.55Λ, 0.50Λ, 0.45Λ, 0.40Λ or smaller than 0.35Λ. The same is also true for a distance between two dual-polarized RX radiators 6 in the same column 4. The respective radiators 2 are preferably only vertically spaced apart.

The distance $w_1$ between two radiators 2 in neighbouring columns 4 is preferably 80 mm. Deviations of less than ±20%, 15%, 10% or less than 5% are possible. The distance between two radiators 2 in neighbouring columns 4 is preferably smaller than the distance between two dual-polarized TX radiators or between two dual-polarized RX radiators 6 in the same column 4. The distance $w_1$ is preferably measured between the centers of the respective radiators in the neighbouring columns 4. The respective radiators 2 are preferably only horizontally spaced apart.

In each of the m columns 4 within the embodiment of FIG. 2A, the multiple dual-polarized TX radiators 5 as well as the multiple dual-polarized RX radiators 6 are arranged at the same position. As such, the m columns 4 are identically constructed to each other.

Within the embodiment of FIG. 2A, the multiple dual-polarized TX radiators 5 and the multiple dual-polarized RX radiators 6 are preferably configured to transmit mobile communication signals in two polarization of the same polarization type. In that case, the multiple dual-polarized TX radiators 5 and the multiple dual-polarized RX radiators 6 support both a ±450 polarization. However, they could also be configured to be operated both in horizontal/vertical polarization or in an elliptic polarization or in a circular polarization.

Figure 2B:
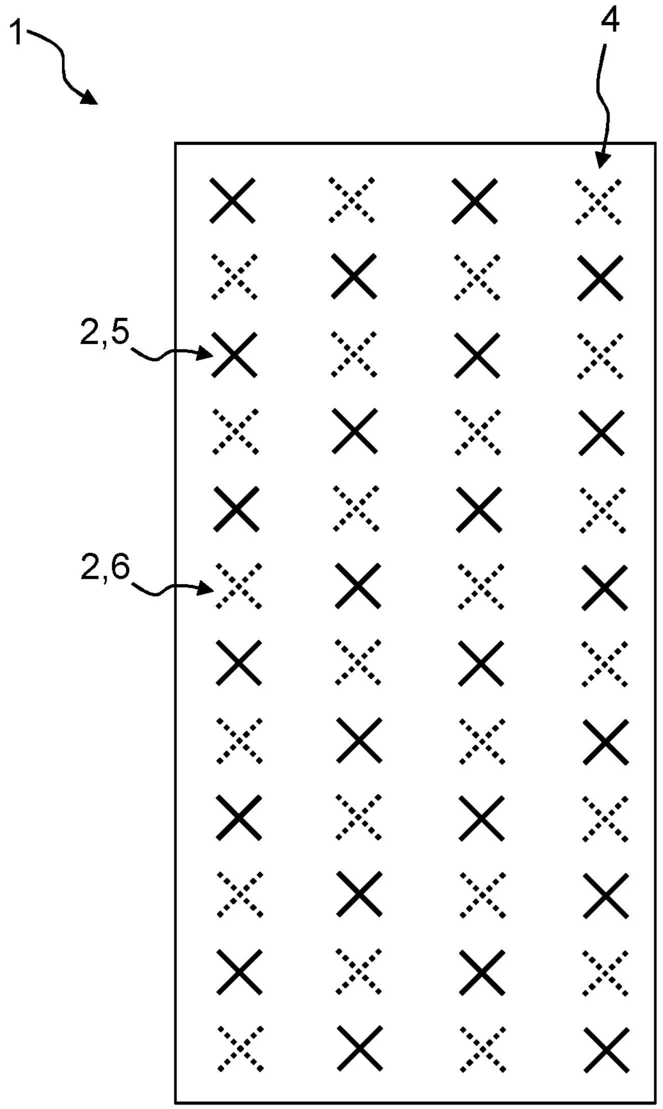

The embodiment of FIG. 2B is similar to the one of FIG. 2A. The main difference is that the multiple dual-polarized TX radiators 5 are arranged in the at least one odd-numbered columns at positions where the dual-polarized RX radiators 6 are arranged in the even-numbered columns. In that case, the odd-numbered columns comprise in the first row dual-polarized TX radiators 5 (solid line) and the even-numbered columns comprise the first row dual-polarized RX radiators 6 (dotted line). Starting from the respective first row, dual-polarized TX radiators 5 and dual-polarized RX radiators 6 are arranged alternatingly.

Figure 3A:
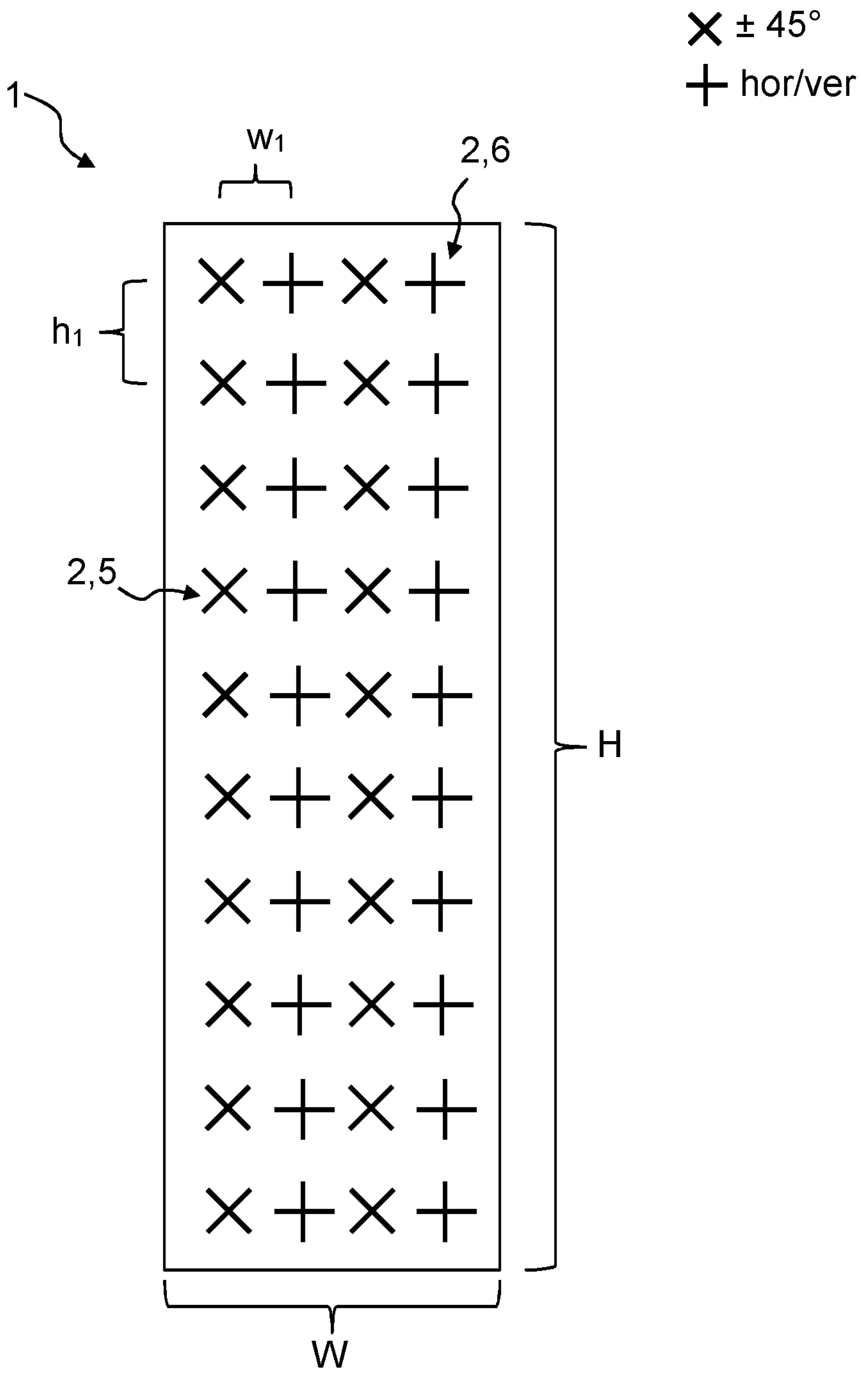
Figure 3B:
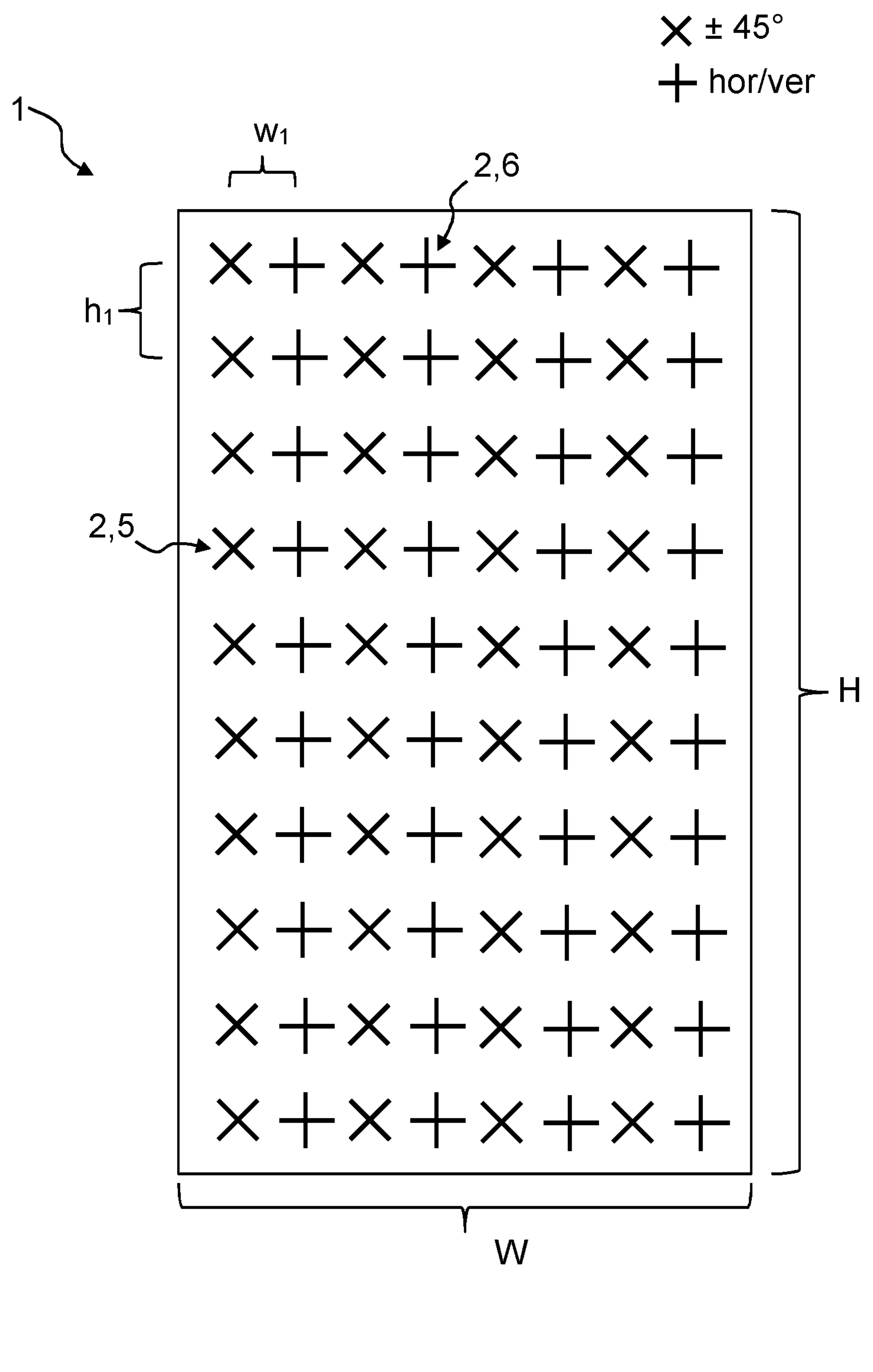

FIGS. 3A, 3B show a view on the plurality of radiators in m columns comprising multiple dual-polarized TX radiators 5 and multiple dual-polarized RX radiators 6 according to other embodiments of the present invention.

The main difference is that the multiple dual-polarized TX radiators 5 are configured to transmit mobile communication signals in two polarizations, wherein both polarizations are of a first polarization type. Contrary to that, the multiple dual-polarized RX radiators 6 are configured to receive mobile communication signals in two polarizations, wherein both polarizations are of a second polarization type. This increases the isolation between the dual-polarized TX radiators 5 and the dual-polarized RX radiators 6 by approximately 3 dB.

In the embodiments shown in FIGS. 3A, 3B, the first polarization type is a ±450 polarization, wherein the second polarization type is a horizontal/vertical polarization. In that case, the multiple dual-polarized TX radiators 5 operate with a ±45° polarization, wherein the multiple dual-polarized RX radiators 6 operate with a horizontal/vertical polarization. However, this could also be reversed, so that the multiple dual-polarized RX radiators 6 operate with a ±45° polarization, wherein the multiple dual-polarized TX radiators 5 operate with a horizontal/vertical polarization.

Within FIG. 3A, there are four columns 4 (m=4). The odd-numbered columns 4 only comprise the multiple dual-polarized TX radiators 5, wherein the even-numbered columns 4 only comprise the multiple dual-polarized RX radiators 6. This could also be reversed, so that the odd-numbered columns 4 only comprise the multiple dual-polarized RX radiators 6, wherein the even-numbered columns 4 only comprise the multiple dual-polarized TX radiators 5. Each column 4 preferably comprises the same amount of radiators 2. A distance $h_1$ between two dual-polarized TX radiators 5 in the same column 4 is preferably 120 mm. The distance is preferably measured between the centers of each dual-polarized TX radiator 5. Deviations of less than ±20%, 15%, 10% or less than 5% are possible. The distance $h_1$ is preferably larger than 0.25Λ, 0.3Λ, 0.35Λ, 0.4Λ, 0.45Λ, 0.5Λ, 0.55Λ, 0.60Λ or larger than 0.65Λ. The distance $h_1$ is preferably smaller than 0.7Λ, 0.65Λ, 0.60Λ, 0.55Λ, 0.50Λ, 0.45Λ, 0.40Λ or smaller than 0.35Λ. The same is also true for a distance between two dual-polarized RX radiators 6 in the neighbouring column 4.

The distance $w_1$ between two radiators 2 in neighbouring columns 4 is preferably 60 mm. Deviations of less than ±20%, 15%, 10% or less than 5% are possible. The distance is preferably measured between the centers of two dual-polarized radiators 2 in the neighbouring columns 4 that are preferably only spaced horizontally to each other.

The width W of the housing of the mobile communication antenna 1 is preferably 320 mm. Deviations of less than ±20%, 15%, 10% or less than 5% are possible.

The height H of the housing of the mobile communication antenna 1 is preferably 540 mm. Deviations of less than ±20%, 15%, 10% or less than 5% are possible.

In general, it could be possible that the multiple dual-polarized TX radiators 5 are of the same radiator type as the multiple dual-polarized RX radiators 6. However, it could also be possible that the multiple dual-polarized TX radiators 5 are of a different radiator type than the multiple dual-polarized RX radiators 6. For example, the multiple dual-polarized TX radiators 5 could be cross dipoles, vector dipoles or patch radiators. The same is also true for the multiple dual-polarized RX radiators 6 which could also be cross dipoles, vector dipoles or patch radiators.

FIG. 3B is a similar embodiment to FIG. 3A. As a main difference, eight columns 4 (m=8) are used. The number of radiators 2 in each column 4 is ten. However, the number could be different.

The width W of the housing of the mobile communication antenna 1 is preferably 480 mm. Deviations of less than ±20%, 15%, 10% or less than 5% are possible.

The height H of the housing of the mobile communication antenna 1 is preferably 1260 mm. Deviations of less than ±20%, 15%, 10% or less than 5% are possible.

The distance $h_1$ and the width $w_1$ are preferably the same as in the embodiment of FIG. 3A.

Figure 4A:
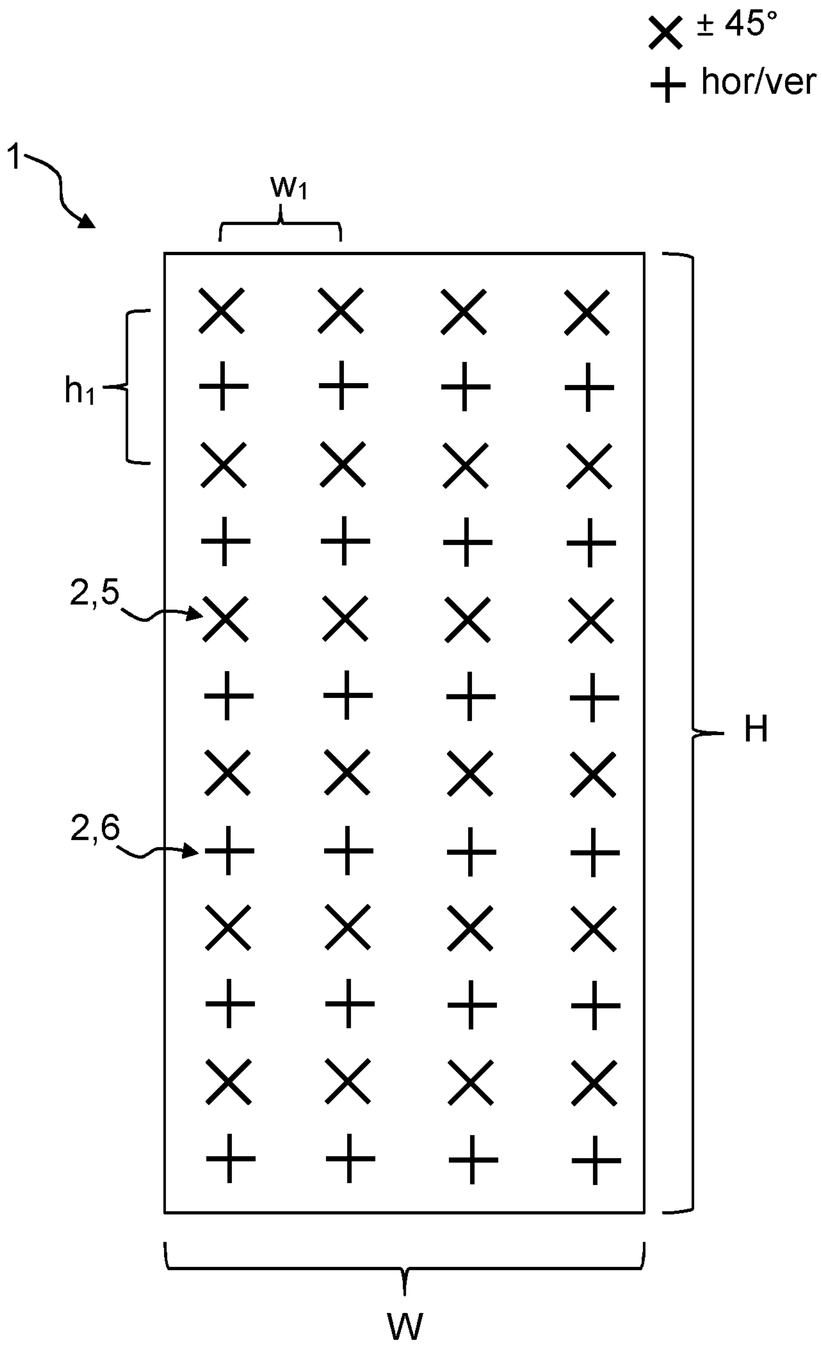
Figure 4B:
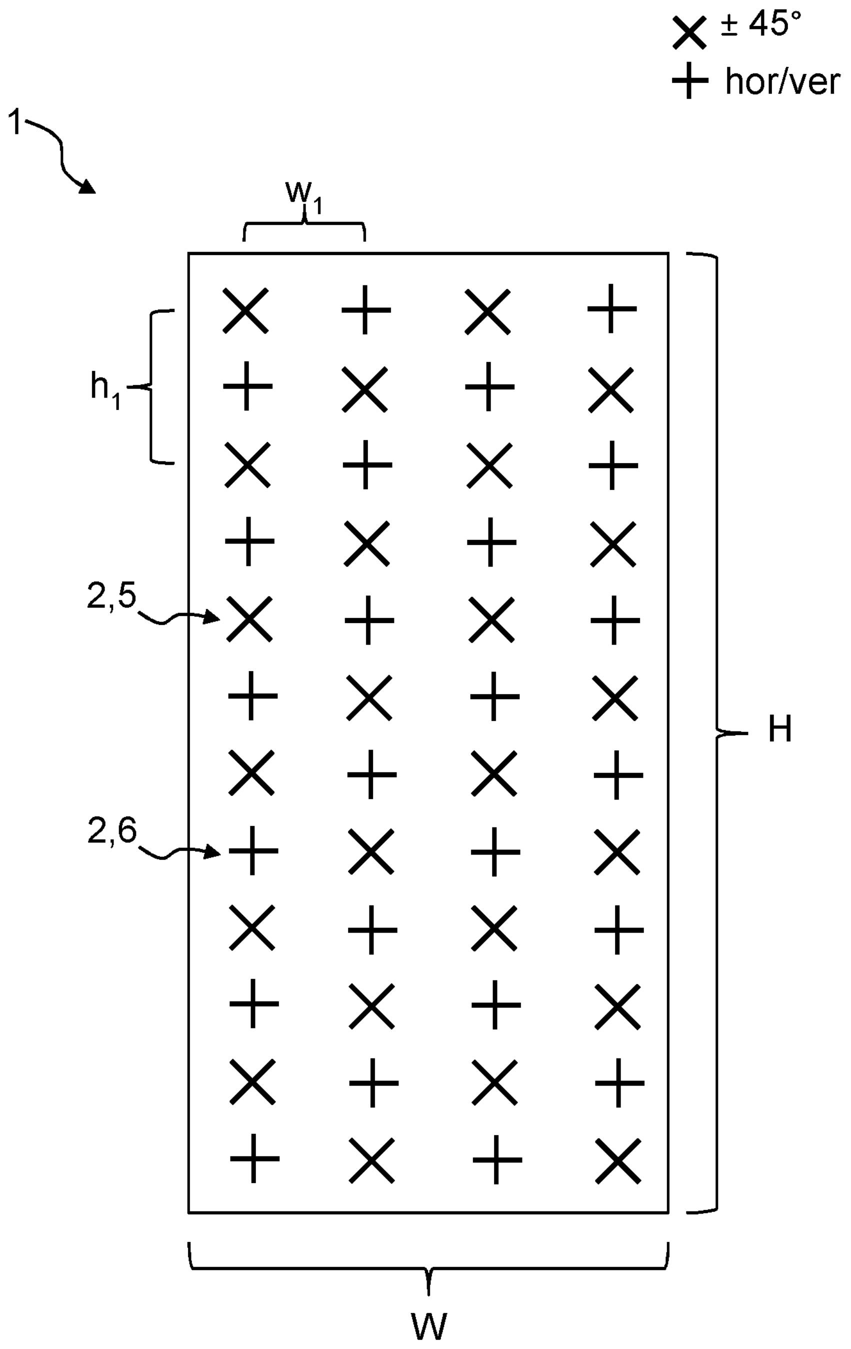

FIGS. 4A, 4B show a view on the plurality of radiators in m columns comprising multiple dual-polarized TX radiators 5 and multiple dual-polarized RX radiators 6 according to other embodiments of the present invention.

A main aspect is that the multiple dual-polarized TX radiators 5 are configured to transmit mobile communication signals in two polarizations, wherein both polarizations are of a first polarization type. Contrary to that, the multiple dual-polarized RX radiators 6 are configured to receive mobile communication signals in two polarizations, wherein both polarizations are of a second polarization type. This increases the isolation between the dual-polarized TX radiators 5 and the dual-polarized RX radiators 6 by approximately 3 dB.

In the embodiments shown in FIGS. 4A, 4B, the first polarization type is a ±45° polarization, wherein the second polarization type is a horizontal/vertical polarization. In that case, the multiple dual-polarized TX radiators 5 operate with a ±45° polarization, wherein the multiple dual-polarized RX radiators 6 operate with a horizontal/vertical polarization. However, this could also be reversed, so that the multiple dual-polarized RX radiators 6 operate with a ±45° polarization, wherein the multiple dual-polarized TX radiators 5 operate with a horizontal/vertical polarization.

Within FIG. 4A, there are four columns 4 (m=4). Each column comprises twelve radiators 2. Those twelve radiators 2 comprise six dual-polarized TX radiators 5 and six dual-polarized RX radiators 6. Each column 4 has an identical structure. This means that the respective dual-polarized TX radiators 5 are arranged at the same position in each column 4. As such, the respective dual-polarized RX radiators 6 are also arranged at the same position in each column 4. The first row of each column 4 comprises dual-polarized TX radiators 5 and the last row of each column 4 comprises dual-polarized RX radiators 6. However, this could also be reversed, so that the first row of each column 4 comprises dual-polarized RX radiators 6 and the last row of each column 4 comprises dual-polarized TX radiators 5. Within each column 4, the dual-polarized TX radiators 5 and the dual-polarized RX radiators 6 are arranged alternatingly to each other.

Each column 4 preferably comprises the same amount of radiators 2. A distance $h_1$ between two dual-polarized TX radiators 5 in the same column 4 is preferably 100 mm. The distance is preferably measured between the centers of each dual-polarized TX radiator 5. Deviations of less than ±20%, 15%, 10% or less than 5% are possible. The distance $h_1$ is preferably larger than 0.25Λ, 0.3Λ, 0.35Λ, 0.4Λ, 0.45Λ, 0.5Λ, 0.55Λ, 0.60Λ or larger than 0.65Λ. The distance $h_1$ is preferably smaller than 0.7Λ, 0.65Λ, 0.60Λ, 0.55Λ, 0.50Λ, 0.45Λ, 0.40Λ or smaller than 0.35Λ. The same is also true for a distance between two dual-polarized RX radiators 6 in the same column 4.

The distance $w_1$ between two radiators 2 in neighbouring columns 4 is preferably 80 mm. Deviations of less than ±20%, 15%, 10% or less than 5% are possible. The distance is preferably measured between the centers of two dual-polarized radiators 2 in the neighbouring columns 4 that are preferably only spaced horizontally to each other.

The height H of the housing of the mobile communication antenna 1 is preferably 650 mm. Deviations of less than ±20%, 15%, 10% or less than 5% are possible. By increasing the numbers of radiators 2 in each column 4, the height H is scaled accordingly.

The width W of the housing of the mobile communication antenna 1 is preferably 320 mm. Deviations of less than ±20%, 15%, 10% or less than 5% are possible. By increasing the numbers of columns 4, the height H is scaled accordingly.

FIG. 4B shows a similar embodiment as FIG. 4A. As a difference, the dual-polarized TX radiators 5 are arranged in the at least one odd-numbered column 4 or in the multiple odd-numbered columns at positions where the dual-polarized RX radiators 6 are arranged in the at least one even-numbered column or in the multiple even-numbered columns. In addition the dual-polarized RX radiators 6 are arranged in the at least one odd-numbered column or in the multiple odd-numbered columns at positions where the dual-polarized TX radiators 5 are arranged in the at least one even-numbered column or in the multiple even-numbered columns.

Preferably all odd-numbered columns have the same structure. Preferably all even-numbered columns have the same structure.

Figure 5A:
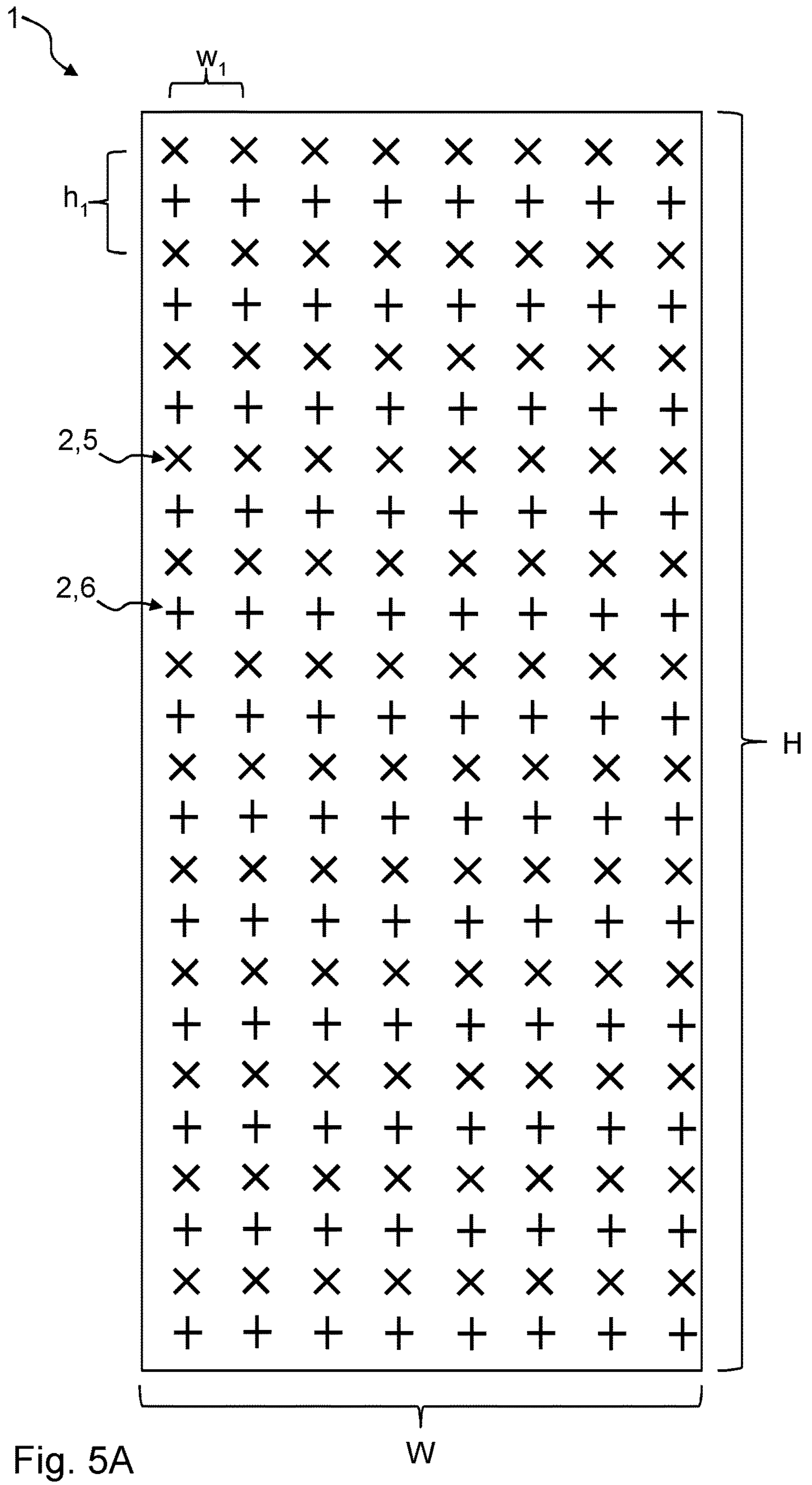
Figure 5B:
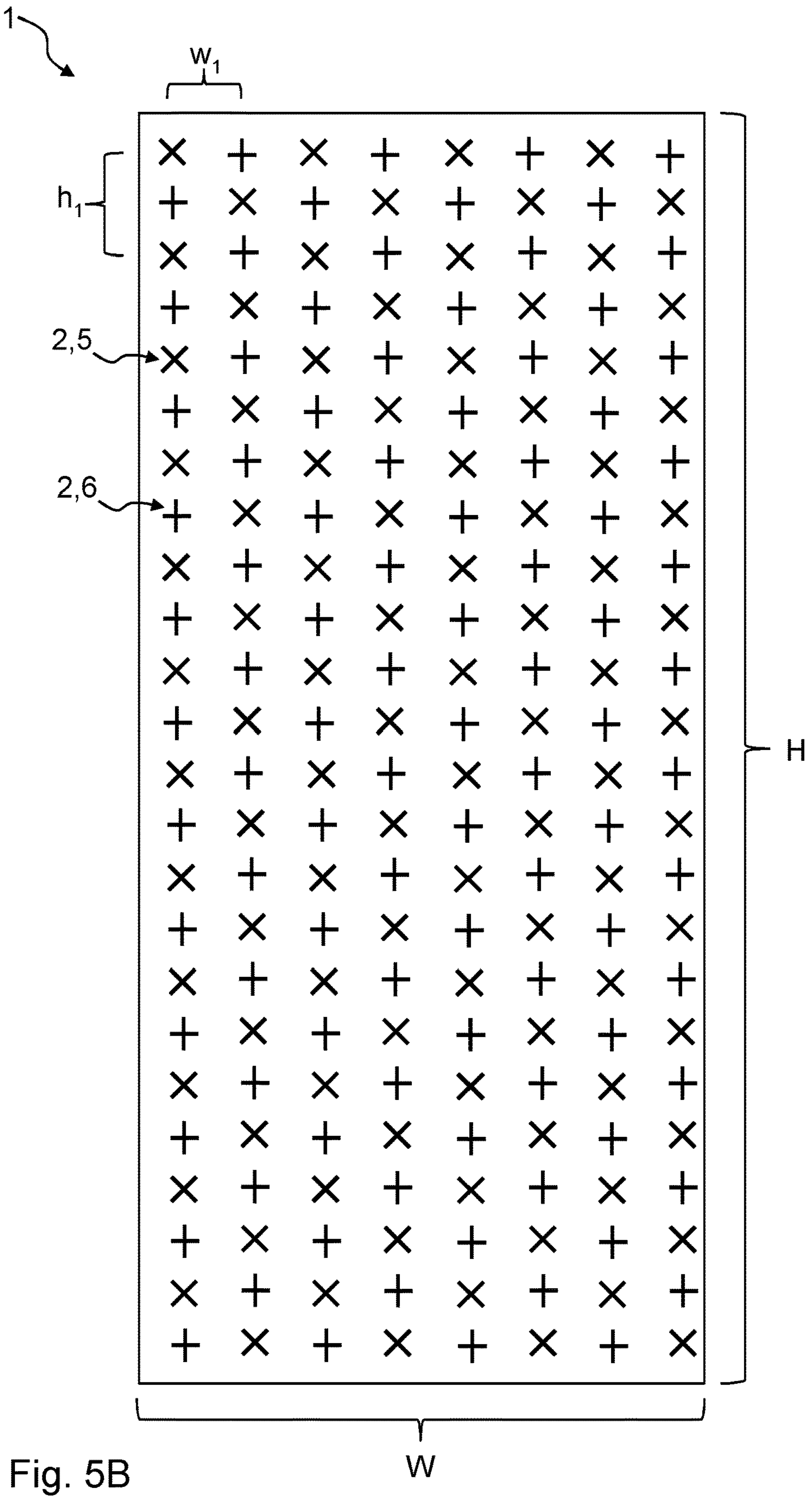

FIGS. 5A, 5B show a view on the plurality of radiators in m columns comprising multiple dual-polarized TX radiators 5 and multiple dual-polarized RX radiators 6 according to other embodiments of the present invention.

A main aspect is that the multiple dual-polarized TX radiators 5 are configured to transmit mobile communication signals in two polarizations, wherein both polarizations are of a first polarization type. Contrary to that, the multiple dual-polarized RX radiators 6 are configured to receive mobile communication signals in two polarizations, wherein both polarizations are of a second polarization type. This increases the isolation between the dual-polarized TX radiators 5 and the dual-polarized RX radiators 6 by approximately 3 dB.

In the embodiments shown in FIGS. 5A, 5B, the first polarization type is a ±45° polarization, wherein the second polarization type is a horizontal/vertical polarization. In that case, the multiple dual-polarized TX radiators 5 operate with a ±45° polarization, wherein the multiple dual-polarized RX radiators 6 operate with a horizontal/vertical polarization. However, this could also be reversed, so that the multiple dual-polarized RX radiators 6 operate with a ±45° polarization, wherein the multiple dual-polarized TX radiators 5 operate with a horizontal/vertical polarization.

Within FIG. 5A, there are eight columns 4 (m=8). Each column comprises twenty-four radiators 2. Those twenty-four radiators 2 comprise twelve dual-polarized TX radiators 5 and twelve dual-polarized RX radiators 6. Each column 4 has an identical structure. This means that the respective dual-polarized TX radiators 5 are arranged at the same position in each column 4. As such, the respective dual-polarized RX radiators 6 are also arranged at the same position in each column 4. The first row of each column 4 comprises dual-polarized TX radiators 5 and the last row of each column 4 comprises dual-polarized RX radiators 6. However, this could also be reversed, so that the first row of each column 4 comprises dual-polarized RX radiators 6 and the last row of each column 4 comprises dual-polarized TX radiators 5. Within each column 4, the dual-polarized TX radiators 5 and the dual-polarized RX radiators 6 are arranged alternatingly to each other.

Each column 4 preferably comprises the same amount of radiators 2. A distance $h_1$ between two dual-polarized TX radiators 5 in the same column 4 is preferably 100 mm. The distance is preferably measured between the centers of each dual-polarized TX radiator 5. Deviations of less than ±20%, 15%, 10% or less than 5% are possible. The distance $h_1$ is preferably larger than 0.25Λ, 0.3Λ, 0.35Λ, 0.4Λ, 0.45Λ, 0.5Λ, 0.55Λ, 0.60Λ or larger than 0.65Λ. The distance $h_1$ is preferably smaller than 0.7Λ, 0.65Λ, 0.60Λ, 0.55Λ, 0.50Λ, 0.45Λ, 0.40Λ or smaller than 0.35Λ. The same is also true for a distance between two dual-polarized RX radiators 6 in the same column 4.

The distance $w_1$ between two radiators 2 in neighbouring columns 4 is preferably 70 mm. Deviations of less than ±20%, 15%, 10% or less than 5% are possible. The distance is preferably measured between the centers of two dual-polarized radiators 2 in the neighbouring columns 4 that are preferably only spaced horizontally to each other.

The height H of the housing of the mobile communication antenna 1 is preferably 1250 mm. Deviations of less than ±20%, 15%, 10% or less than 5% are possible. By increasing the numbers of radiators 2 in each column 4, the height H is scaled accordingly.

The width W of the housing of the mobile communication antenna 1 is preferably 580 mm. Deviations of less than ±20%, 15%, 10% or less than 5% are possible. By increasing the numbers of columns 4, the height H is scaled accordingly.

FIG. 5B shows a similar embodiment as FIG. 5A. As a difference, the dual-polarized TX radiators 5 are arranged in the at least one odd-numbered column 4 or in the multiple odd-numbered columns at positions where the dual-polarized RX radiators 6 are arranged in the at least one even-numbered column or in the multiple even-numbered columns. In addition the dual-polarized RX radiators 6 are arranged in the at least one odd-numbered column or in the multiple odd-numbered columns at positions where the dual-polarized TX radiators 5 are arranged in the at least one even-numbered column or in the multiple even-numbered columns.

Preferably all odd-numbered columns have the same structure. Preferably all even-numbered columns have the same structure.

If there is a group of interconnected dual-polarized TX radiators 5, preferably the respective dual-polarized TX radiators 5 of the same column 4 which are arranged in the center or close to the center of the respective column are connected to each other. It could also be that dual-polarized TX radiators 5 of different columns 4 are connected to each other. However, also in that case, preferably the dual-polarized TX radiators 5 arranged in the center or close to the center of each column are connected to each other. The same is preferably also true for interconnected dual-polarized RX radiators 6.

The mobile communication antenna 1 could also comprise the following features:

- a reflector arrangement 3 is provided;
- a plurality of dual-polarized radiators 2 are provided, which are arranged in at least m columns 4 on a first side of the reflector arrangement 3, with m≥2, 3, 4, 5, 6, 7, 8, 9, 10, 11, 12, 13, 14, 15, 16; 32, 64, 128
- the plurality of dual-polarized radiators 2 comprises multiple dual-polarized TX radiators 5 and multiple dual-polarized RX radiators 6;
- each of the multiple dual-polarized TX radiators 5 is only used for transmitting a mobile communication signal received from a transmitter arrangement 7;
- each of the multiple dual-polarized RX radiators 6 is only used for receiving a mobile communication signal and for forwarding this mobile communication signal to a receiver arrangement 8;
- the multiple dual-polarized TX radiators 5 are arranged in at least two columns 4 and the multiple dual-polarized RX radiators 6 are arranged in at least two columns 4.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A mobile communication antenna comprising the following features:

- a reflector arrangement is provided;
- a plurality of dual-polarized radiators are provided, which are arranged in at least m columns on a first side of the reflector arrangement, with m≥2, 3, 4, 5, 6, 7, 8, 9, 10, 11, 12, 13, 14, 15, 16, 32, 64, 128;
- the plurality of dual-polarized radiators comprises multiple dual-polarized TX radiators and multiple dual-polarized RX radiators;
- each of the multiple dual-polarized TX radiators comprises a signal connector arrangement, wherein the respective signal connector arrangement is connected only to a transmitter arrangement for communicating a mobile communication signal;
- each of the multiple dual-polarized RX radiators comprises a signal connector arrangement, wherein the respective signal connector arrangement is connected only to a receiver arrangement for communicating a mobile communication signal;

the multiple dual-polarized TX radiators are arranged in at least two columns of the m columns and the multiple dual-polarized RX radiators are arranged in at least two columns of the m columns; and the multiple dual-polarized TX radiators are configured to transmit mobile communication signals in two polarizations of a first polarization type and the multiple dual-polarized RX radiators are configured to receive mobile communication signals in two polarizations of a second polarization type, wherein the first and second polarization types are different, and wherein the multiple dual-polarized TX radiators are of a different radiator type than the multiple dual-polarized RX radiators, wherein the multiple dual-polarized TX radiators are dipoles and the multiple dual-polarized RX radiators are patches, or wherein the multiple dual-polarized TX radiators are patches and the multiple dual-polarized TX radiators are dipoles.

2. The mobile communication antenna according to claim 1, characterized by the following feature:

at least two dual-polarized TX radiators in the same column of the m columns, a distance between two dual-polarized TX radiators in the same column is:

larger than 0.25Λ, 0.3Λ, 0.35Λ, 0.4Λ, 0.45Λ, 0.5Λ, 0.55Λ, 0.60Λ or larger than 0.65Λ, where Λ is a wavelength of a mid-frequency of the dual-polarized TX radiators; and/or smaller than 0.7Λ, 0.65Λ, 0.60Λ, 0.55Λ, 0.50Λ, 0.45Λ, 0.40Λ or smaller than 0.35Λ; and/or at least two dual-polarized RX radiators in the same column of the m columns, a distance between two dual-polarized RX radiators in the same column is:

larger than 0.25Λ, 0.3Λ, 0.35Λ, 0.4Λ, 0.45Λ, 0.5Λ, 0.55Λ, 0.60Λ or larger than 0.65Λ, where Λ is a wavelength of a mid-frequency of the dual polarized RX radiators; and/or smaller than 0.7Λ, 0.65Λ, 0.60Λ, 0.55Λ, 0.50Λ, 0.45Λ, 0.40Λ or smaller than 0.35Λ.

3. The mobile communication antenna according to claim 1, characterized by the following features:

a signal processing device is provided;

the multiple dual-polarized TX radiators are connected to the signal processing device via the transmitter arrangement;

the multiple dual-polarized RX radiators are connected to the signal processing device via the receiver arrangement.

4. The mobile communication antenna according to claim 3, characterized by the following features:

the transmitter arrangement comprises a filter device with one or more transmitting filters;

the receiver arrangement comprises a filter device with one or more receiving filters;

the receiving filter or receiving filters in the receiver arrangement are of a different filter type than the transmitting filter or transmitting filters in the transmitter arrangement.

5. The mobile communication antenna according to claim 4, characterized by the following features:

the transmitter arrangement comprises a transmission signal path for each polarization of each:

dual-polarized TX radiator; and/or group of interconnected dual-polarized TX radiators;

wherein at least one transmitting filter with several filter circuits is arranged in each transmission signal path;

the receiver arrangement comprises a receiving signal path for each polarization of each:

dual-polarized RX radiator; and/or group of interconnected dual-polarized RX radiators;

wherein at least one receiving filter with several filter circuits is arranged in each receiving signal path;

the at least one receiving filter in the respective receiving signal path has smaller spatial dimensions than the at least one transmitting filter in the respective transmission signal path.

6. The mobile communication antenna according to claim 3, characterized by the following features:

the transmitter arrangement comprises a transmission signal path for each polarization of:

each dual-polarized TX radiator; and each group of interconnected dual-polarized TX radiators;

wherein at least one power amplifier is arranged in each transmission signal path;

the power amplifier connected to a group of interconnected dual-polarized TX radiators is stronger in power than the power amplifier connected to a single dual-polarized TX radiator.

7. The mobile communication antenna according to claim 3, characterized by the following features:

the signal processing device is configured to generate:

individual transmission signals for each dual-polarized TX radiator; and/or group-based transmission signals for a group of interconnected dual-polarized TX radiators;

wherein the transmitter arrangement is configured to transmit the:

individual transmission signals to the corresponding dual-polarized TX radiator; and/or group-based transmission signals to the corresponding group of interconnected dual-polarized TX radiators;

and/or the receiver arrangement is configured to receive:

individual receiving signals from the dual-polarized RX radiators and transmit them to the signal processing device; and/or group-based receiving signals from a group of interconnected dual-polarized RX radiators and transmit them to the signal processing device.

8. The mobile communication antenna according to claim 1, characterized by the following feature:

each of the m columns comprises multiple dual-polarized TX radiators as well as multiple dual-polarized RX radiators, which are arranged alternatingly in each column.

9. The mobile communication antenna according to claim 8, characterized by the following feature:

in each of the m columns, the multiple dual-polarized TX radiators as well as the multiple dual-polarized RX radiators are arranged at the same position, whereby the m columns are identically constructed to each other; or the multiple dual-polarized TX radiators are arranged in at least one odd-numbered column or in multiple odd-numbered columns at the same positions where the multiple dual-polarized RX radiators are arranged in at least one even-numbered column or in multiple even-numbered columns; and the multiple dual-polarized RX radiators are arranged in at least one odd-numbered column or in multiple odd-numbered columns at the same positions where the multiple dual-polarized TX radiators are arranged in at least one even-numbered column or in multiple even-numbered columns.

10. The mobile communication antenna according to claim 1, characterized by the following feature:

m is at least ≥4;

the multiple dual-polarized TX radiators are arranged predominantly or exclusively in odd-numbered columns and the multiple dual-polarized RX radiators are arranged predominantly or exclusively in even-numbered columns; or the multiple dual-polarized TX radiators are arranged predominantly or exclusively in even-numbered columns and the multiple dual-polarized RX radiators are arranged predominantly or exclusively in odd-numbered columns.

11. The mobile communication antenna according to claim 1, further characterized by the following feature:

either:

the first polarization type is a ±45° polarization and the second polarization type is a horizontal/vertical polarization; or the first polarization type is a horizontal/vertical polarization and the second polarization type is a ±45° polarization.

12. The mobile communication antenna according to claim 11, further characterized by the following feature:

at least two dual-polarized TX radiators in the same column of the m columns, a distance between two dual-polarized TX radiators in the same column is:

larger than 0.25Λ, 0.3Λ, 0.35Λ, 0.4Λ, 0.45Λ, 0.5Λ, 0.55Λ, 0.60Λ or larger than 0.65Λ, where Λ is a wavelength of a mid-frequency of the dual-polarized TX radiators or dual polarized RX radiators; and/or smaller than 0.7Λ, 0.65Λ, 0.60Λ, 0.55Λ, 0.50Λ, 0.45Λ, 0.40Λ or smaller than 0.35Λ; and/or at least two dual-polarized RX radiators in the same column of the m columns, a distance between two dual-polarized RX radiators in the same column is:

larger than 0.25Λ, 0.3Λ, 0.35Λ, 0.4Λ, 0.45Λ, 0.5Λ, 0.55Λ, 0.60Λ or larger than 0.65Λ, where Λ is a wavelength of a mid-frequency of the dual polarized RX radiators; and/or smaller than 0.7Λ, 0.65Λ, 0.60Λ, 0.55Λ, 0.50Λ, 0.45Λ, 0.40Λ or smaller than 0.35Λ.

* * * * *